(12) United States Patent
Satou et al.

(10) Patent No.: US 11,099,542 B2
(45) Date of Patent: Aug. 24, 2021

(54) INPUT ERROR DETECTION DEVICE

(71) Applicant: FANUC Corporation, Yamanashi (JP)

(72) Inventors: Kouji Satou, Yamanashi (JP); Shinichi Ozeki, Yamanashi (JP); Shinichirou Itakura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/361,209

(22) Filed: Mar. 22, 2019

(65) Prior Publication Data

US 2019/0294148 A1   Sep. 26, 2019

(30) Foreign Application Priority Data

Mar. 23, 2018  (JP) .............................. JP2018-057026

(51) Int. Cl.
*G05B 19/4093* (2006.01)
*G05B 19/408* (2006.01)
*G05B 19/18* (2006.01)

(52) U.S. Cl.
CPC ..... *G05B 19/40937* (2013.01); *G05B 19/182* (2013.01); *G05B 19/408* (2013.01); *G05B 2219/31103* (2013.01)

(58) Field of Classification Search
CPC ............ G05B 19/40937; G05B 19/182; G05B 19/408; G09G 3/3406; G06T 5/40
USPC ........................................................ 700/86
See application file for complete search history.

(56) References Cited

U.S. PATENT DOCUMENTS

| | | | | |
|---|---|---|---|---|
| 6,108,647 | A | * | 8/2000 | Poosala .............. G06Q 30/0283 |
| 6,507,181 | B1 | * | 1/2003 | Pakonen ................ G01R 31/12 |
| | | | | 324/536 |
| 6,714,378 | B1 | | 3/2004 | Uno et al. |
| 2005/0197723 | A1 | | 9/2005 | Harada et al. |
| 2006/0102858 | A1 | * | 5/2006 | Fujii ....................... G01N 21/88 |
| | | | | 250/559.45 |
| 2012/0288197 | A1 | * | 11/2012 | Adachi .................. H04N 9/646 |
| | | | | 382/167 |

(Continued)

FOREIGN PATENT DOCUMENTS

| | | |
|---|---|---|
| JP | H4283046 A | 10/1992 |
| JP | 2001155451 A | 6/2001 |
| JP | 2003-295916 A | 10/2003 |

(Continued)

OTHER PUBLICATIONS

JP2003295916 A titled "Numerical Control Device Comprising Input Verification Means", Inventor(s): Furuta Tetsuya; Applicant(s): Okuma Machinery Works LTD., English translation (Year: 2003).*

*Primary Examiner* — Rocio Del Mar Perez-Velez
*Assistant Examiner* — Alicia M. Choi
(74) *Attorney, Agent, or Firm* — Hauptman Ham, LLP

(57) ABSTRACT

An input error detection device can detect an input error based on input values input in the past and the trend of values from the view point of the whole of a control program. In order to detect an error in inputting a value used to control a manufacturing machine, the input error detection device is provided with a histogram creation unit configured to create a histogram, based on a set of values used to control the manufacturing machine, and a determination unit configured, based on the histogram, to determine input errors of the values used to control the manufacturing machine.

8 Claims, 6 Drawing Sheets

(56) References Cited

U.S. PATENT DOCUMENTS

2016/0277268 A1* 9/2016 Brown ................ G06F 11/3476

FOREIGN PATENT DOCUMENTS

JP          2003295916 A * 10/2003 ........... G05B 19/409
JP            3949689 B2    4/2007

* cited by examiner

X-COORDINATE VALUE: OCCURRENCE FREQUENCY OF DECIMAL-POINTED NUMERICAL VALUES

X-COORDINATE VALUE: OCCURRENCE FREQUENCY OF NON-DECIMAL-POINTED NUMERICAL VALUES

```
O3720 (BAGUE MAINT) ;
(KAL.A22A01) ;
(MAT.1.0) ;
;
M23720 ;
M500 ;
G28 U0.0 ;
G300 X10.0 Z10.0 T1400 ;
M3 S8000 ;
M61 ;
M08 ;
;
T1414 (PLANDREHEN, X0.7 DREHEN) ;
M3 S8000 ;
M12 ;
G00 X10.0 Z10.0 F1500 ;
G04 U0.01 ;
G04 U0.02 ;
G01 G99 Z0.0 H0.0 ;
M4 S8000 ;
...
```

INPUT ERROR DETECTION DEVICE

RELATED APPLICATION

The present application claims priority to Japanese Application Number 2018-057026 filed Mar. 23, 2018, the disclosure of which is hereby incorporated by reference herein in its entirety.

BACKGROUND OF THE INVENTION

Field of the Invention

The present invention relates to an input error detection device, and more particularly, to an input error detection device configured to detect an error in inputting data to be handled in a numerical controller.

Description of the Related Art

When coordinate values (command values) or offset values are input to a numerical controller for controlling a manufacturing machine such as a machine tool, there is a possibility of occurrence of failure to enter a decimal point, error in the number of digits (error in the number of zeros or the position of a decimal point), wrong entry of axis names, or the like. Due to such an input error, the spindle of the manufacturing machine or the like may sometimes be broken by collision or damage a workpiece.

For example, Japanese Patent Application Laid-Open No. 2003-295916 discloses a conventional technique for detecting such an input error in the numerical controller. According to this technique, it is determined whether or not an item input to the numerical controller satisfies conditions obtained by combining a standard deviation and an average of numerical values set for the same item. If the conditions are not satisfied, in this technique, a message to that effect is displayed.

Moreover, for example, Japanese Patent No. 3949689 discloses a conventional technique for detecting an input error of data input in creating a control program to be executed in a numerical controller. According to this technique, a warning is issued if the input data is a word to be subjected to a decimal point check and has no decimal point added thereto or is deviated from the range of maximum/minimum command amounts in which the numerical controller can be handled.

However, the values input to the numerical controller are not always be concentrated near specific values only. For example, in setting a workpiece coordinate system origin while machining a workpiece set in the manufacturing machine, as shown in FIG. 8, a vertex or the center of the workpiece may sometimes be set as the workpiece coordinate system origin. In such a case, a vertex or the center of the workpiece is set as the workpiece coordinate system origin. If the technique disclosed in Japanese Patent Application Laid-Open No. 2003-295916 is used, on the other hand, an average value and a variance are calculated based on past input values in which the machine coordinate values of the workpiece vertex are mixed with those of the workpiece center, and the correctness of a newly input value is determined using the calculated conditions. Therefore, such a problem is caused that the machine coordinate values of a position between the vertex and center of the workpiece are inevitably determined to be correct, that is, the accuracy of incorrectness determination for the input value is reduced. A similar problem also occurs when a tool offset value is set in a manufacturing machine that can handle a plurality of tools, for example. Although the tool offset value varies depending on the tool type, the setting of the tool offset value in the manufacturing machine is not guaranteed with a set item for each tool type. Therefore, also in this case, the technique disclosed in Japanese Patent Application Laid-Open No. 2003-295916 cannot ensure correct functioning of correctness determination of the input value.

Furthermore, as illustrated in FIG. 9, the control program executed in the numerical controller for controlling the manufacturing machine includes a number of words (addresses and numerical values), which specify command coordinate values, offset values, and the like. However, in creating or correcting the control program, the spindle of the manufacturing machine or the like may sometimes be broken by collision or damage a workpiece due to an input error. If the technique disclosed in Japanese Patent No. 3949689 is used to deal with this problem, although some input errors can be detected, they are only formal errors (input of values outside the range of specifications, wrong input of a decimal point, etc.). Thus, there is such a problem that this technique functions only limitedly for input error detection from the view point of the trend of input values in the entire control program.

SUMMARY OF THE INVENTION

Accordingly, the object of the present invention is to provide an input error detection device capable of detecting an input error based on input values input in the past and the trend of values from the view point of the whole of a control program.

An input error detection device of the present invention solves the above problems by creating a histogram of input values and detecting a worker's input error based on comparison with the created histogram. The input error detection device of the present invention performs more advanced input error detection by catching the trend of input values using a histogram created based on values input in the past and a histogram created according to a control program position.

One aspect of the present invention is an input error detection device, which is configured to detect an input error in inputting a value used to control a manufacturing machine, and comprises a histogram creation unit configured to create a histogram based on a set of values used to control the manufacturing machine and a determination unit configured, based on the histogram, to determine input errors of the values used to control the manufacturing machine.

According to the present invention, an input error can be accurately detected even when different input trends exist mixedly for the same item. Moreover, advanced input error detection can be performed based on the whole trend of values, as well as on a simple deviation of an input range, wrong input of a decimal point, and the like.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Embodiments of the present invention will now be described with reference to the accompanying drawings.

Figure 1:
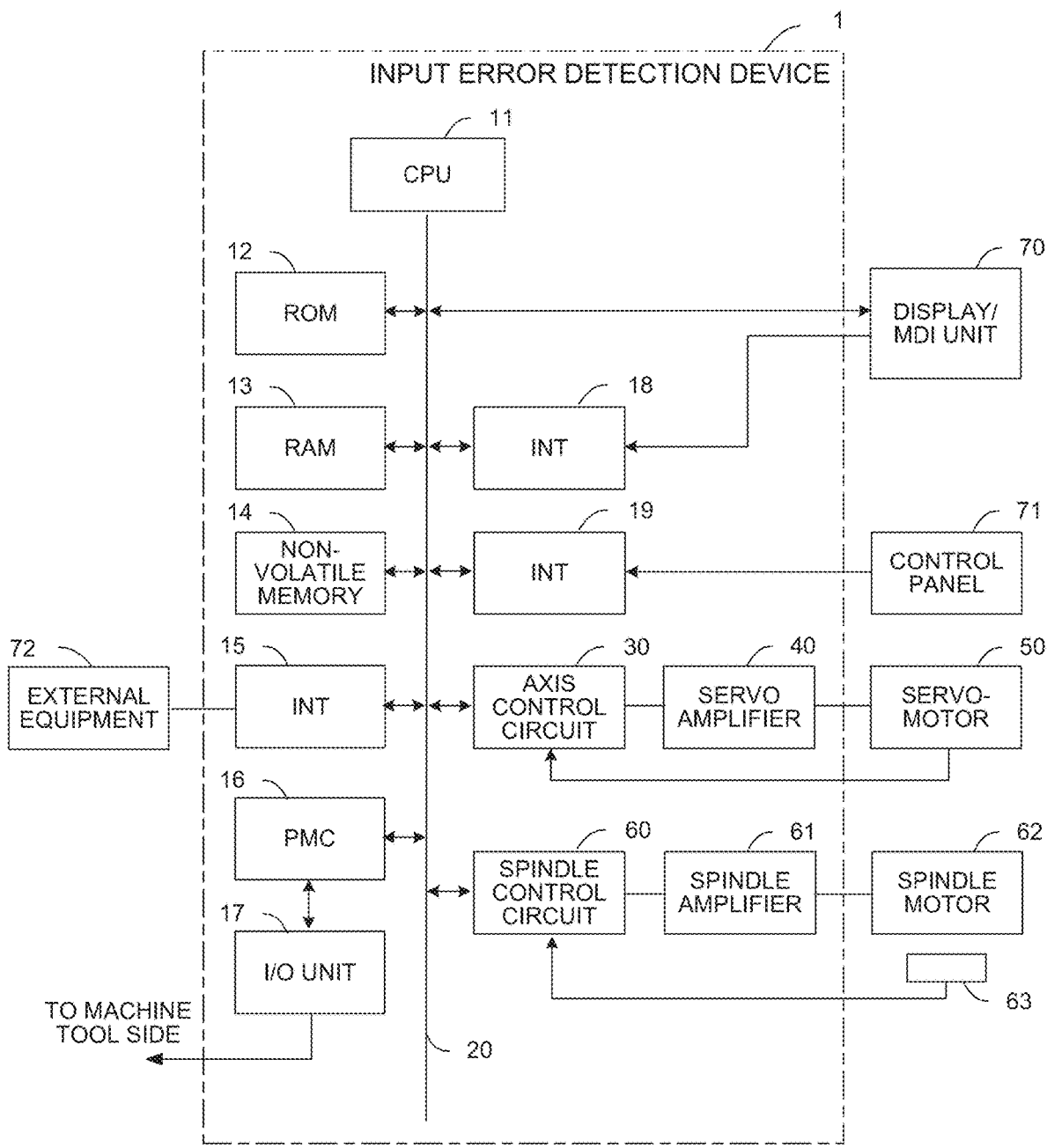
FIG. 1 is a schematic hardware configuration diagram of an input error detection device according to a first embodiment.

FIG. 1 is a schematic hardware configuration diagram showing principal parts of an input error detection device according to one embodiment of the present invention. An input error detection device 1 can be implemented as a control device for controlling a manufacturing machine, such as a robot or a machine tool. Moreover, the input error detection device 1 can be implemented as a personal computer located together with the control device for controlling the machine or a computer, such as a cell computer, host computer, or cloud server, connected to the control device through a network. FIG. 1 shows an example of a case where the input error detection device 1 is implemented as the control device for controlling the machine.

A CPU 11 of the input error detection device 1 according to the present embodiment is a processor for generally controlling the input error detection device 1. The CPU 11 reads out system programs stored in a ROM 12 via a bus 20 and controls the entire input error detection device 1 according to the system programs. A RAM 13 is temporarily loaded with temporary calculation data and display data, various data input through an input unit (not shown) by an operator, and the like.

A non-volatile memory 14 is constructed as a memory that is, for example, backed up by a battery (not shown) so that its storage state can be maintained even when the input error detection device 1 is powered off. The non-volatile memory 14 is stored with control programs read from external equipment 72 through an interface 15, control programs input through a display/MDI unit 70, and various data acquired from various parts of the input error detection device 1, the manufacturing machine, sensors, and the like. The control programs and the various data stored in the non-volatile memory 14 may be developed in the RAM 13 during execution or use. Moreover, various system programs, such as known analysis programs, are previously written in the ROM 12.

The interface 15 is an interface for connecting the input error detection device 1 and the external equipment 72, e.g., an adapter. Control programs, various parameters, and the like are read in from the side of the external equipment 72. Moreover, an external storage means can be stored with the control programs edited in the input error detection device 1, the various parameters, and the like. A PMC (programmable machine controller) 16 controls the manufacturing machine and its peripheral devices (e.g., an actuator such as a robot hand for tool change and sensors installed on the manufacturing machine) by outputting signals to them through an I/O unit 17 according to a sequential program incorporated in the input error detection device 1. Furthermore, on receiving signals from various switches of a control panel on the main body of the manufacturing machine and the peripheral devices, the PMC 16 performs necessary signal processing and then delivers the signals to the CPU 11.

The display/MDI unit 70 is a manual data input device equipped with a display, keyboard and the like, and an interface 18 receives commands and data from the keyboard of the display/MDI unit 70 and delivers them to the CPU 11. An interface 19 is connected to a control panel 71 equipped with a manual pulse generator and the like used to manually drive axes.

An axis control circuit 30 for controlling the axes of the manufacturing machine receives a movement command amount of each axis from the CPU 11 and outputs a command for the axis to a servo amplifier 40. On receiving this command, the servo amplifier 40 drives a servomotor 50 for moving the axes of the manufacturing machine. The servomotor 50 for the axes has a position/speed detector built-in and feeds back a position/speed feedback signal from this position/speed detector to the axis control circuit 30, thereby performing position/speed feedback control. In the hardware configuration diagram of FIG. 1, the axis control circuit 30, servo amplifier 40, and servomotor 50 are each shown as being only one in number. Actually, however, these elements are provided corresponding in number to the feed axes of the manufacturing machine to be controlled.

A spindle control circuit 60 receives a spindle rotation command and outputs a spindle speed signal to a spindle amplifier 61. On receiving this spindle speed signal, the spindle amplifier 61 rotates a spindle motor 62 of the manufacturing machine at a commanded rotational speed, thereby driving a tool. A position coder 63 is connected to the spindle motor 62. The position coder 63 outputs feedback pulses in synchronism with the rotation of a spindle and the feedback pulses are read by the CPU 11.

Figure 2:
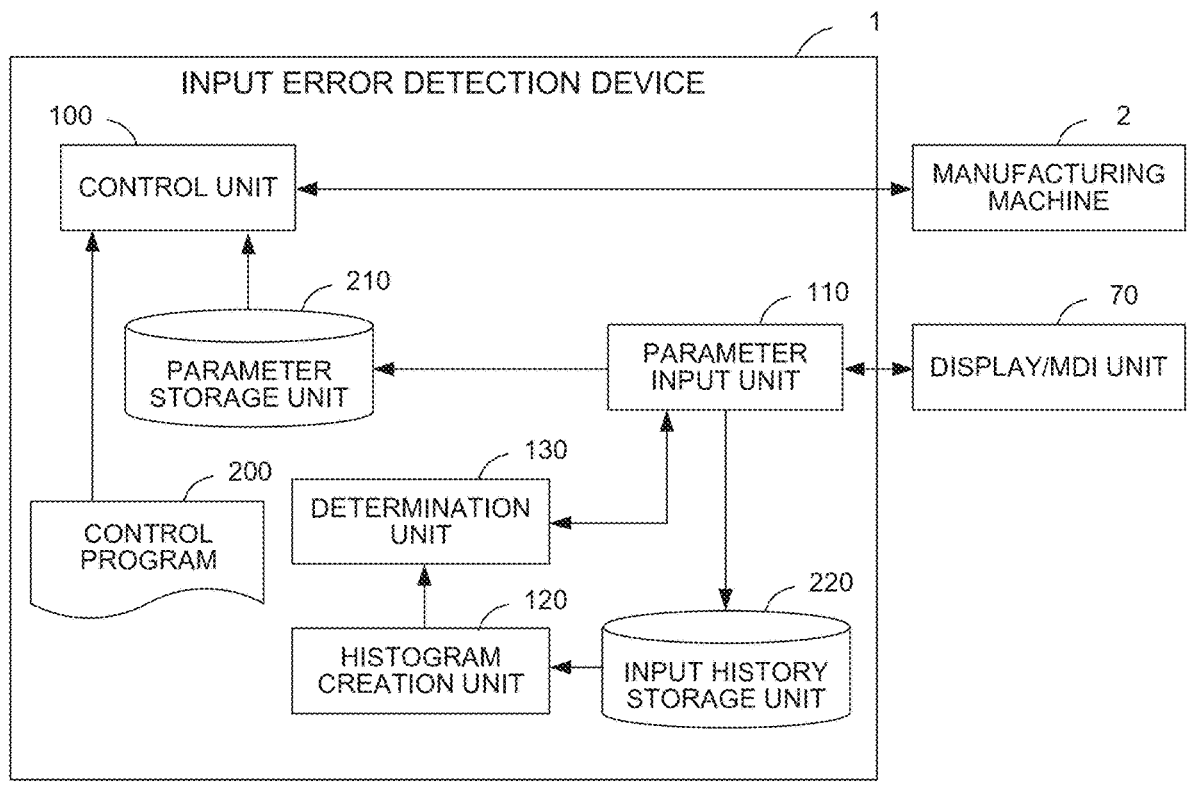
FIG. 2 is a schematic functional block diagram of the input error detection device according to the first embodiment.

FIG. 2 is a schematic functional block diagram of the input error detection device 1 according to the first embodiment. Each of functional blocks shown in FIG. 2 is implemented as the CPU 11 of the input error detection device 1 shown in FIG. 1 executes the individual system programs and controls operations of the various parts of the input error detection device 1.

The input error detection device 1 of the present embodiment comprises a control unit 100, parameter input unit 110, histogram creation unit 120, and determination unit 130. The control unit 100 controls a manufacturing machine 2 based on a control program 200 and control parameters set in a parameter storage unit 210. The parameter input unit 110 accepts parameters input by a worker's operation of the display/MDI unit 70. The histogram creation unit 120 creates a histogram based on histories of the parameters that are input in the past. The determination unit 130 determines the propriety of parameters input from the parameter input unit 110, based on the histogram created by the histogram creation unit 120. Moreover, areas for a parameter storage unit 210 and an input history storage unit 220 are secured on a memory such as the non-volatile memory 14. The parameter storage unit 210 sets and stores parameters used for control, while the input history storage unit 220 stores an input history for each parameter input from the parameter input unit 110.

The control unit 100 is a functional means for reading out a block in the control program from the non-volatile memory 14 and controlling the manufacturing machine 2 based on a command in the block concerned and the control parameters (workpiece coordinate system origin, feed rate, spindle speed, tool offset value, etc.) set in the parameter storage unit 210. The control unit 100 has a general function for controlling various parts of the manufacturing machine 2. For example, the control unit 100 outputs an amount of movement for each control period to the servomotor 50 for driving the axes of the manufacturing machine 2 when the block in the control program commands the axes to move, or outputs an operation command to a peripheral device (not shown) attached to the manufacturing machine 2 when the block in the control program commands the peripheral device to operate.

The parameter input unit 110 is a functional means for accepting the parameters, such as the value of the workpiece coordinate system origin and the tool offset value, input by the worker's operation of the display/MDI unit 70, and setting applicable parameter set items of the parameter storage unit 210. The parameter input unit 110 displays a parameter item setting screen on the display/MDI unit 70, based on the worker's operation of the display/MDI unit, and sets parameter values input from the displayed setting screen in the parameter storage unit 210. Before setting the parameter values input from the setting screen in a setting area for applicable parameter items of the parameter storage unit 210, the parameter input unit 110 commands the determination unit 130 to determine the input parameter values based on the parameter values input for the parameter items input in the past. Thereafter, if the determination by the determination unit 130 reveals that the input parameter values are inappropriate in view of the past input histories, the parameter input unit 110 displays a message to the effect that the parameter values may possibly be wrong, on the display/MDI unit 70, and inquires whether or not to set the values directly. If there is an answer that the parameter values input by the worker are to be set directly, the parameter input unit 110 sets the input parameter values in the parameter storage unit 210. In setting the parameter values in the parameter storage unit 210, the parameter input unit 110 simultaneously stores them as an input history for each parameter item into the input history storage unit 220.

The parameter input unit 110 may also be configured so that if the determination unit 130 estimates the cause of a wrong input of a newly input parameter value by the worker, the result of the estimation is displayed on the display/MDI unit 70.

The histogram creation unit 120 is a functional means for creating the histogram based on the input history of each of the parameter items accumulated in the input history storage unit 220. The histogram creation unit 120 creates the histogram by, for example, dividing the parameter values input in the past into classes for each predetermined range and adding up the respective frequencies (input frequencies) of the individual classes.

Figure 3:
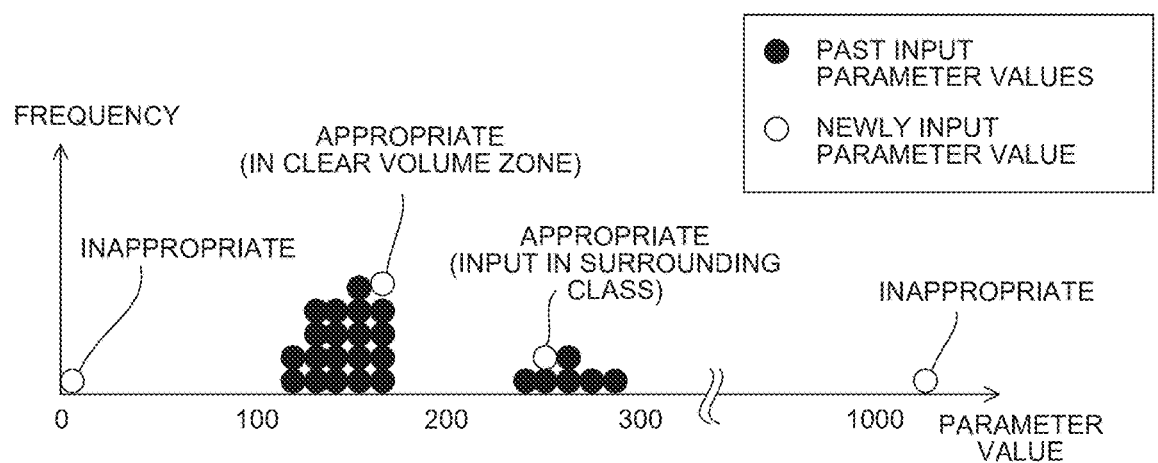
FIG. 3 is a diagram showing an example of a histogram based on an input history.

The determination unit 130 is a functional means for determining the propriety of a parameter value of a parameter item newly input from the parameter input unit 110 by comparison with the histogram based on the input history of the parameter item created by the histogram creation unit 120. FIG. 3 is diagram showing an example of the histogram created by the histogram creation unit 120. In FIG. 3, values input in the past are represented by filled circles and the histogram is expressed as a stack of filled circles. As illustrated in FIG. 3, the determination unit 130 may be configured to determine a newly input parameter value to be appropriate if it is within a clear volume zone (class indicative of a frequency not lower than a preset predetermined threshold) on the histogram or within a range where a class with the input history indicative of a frequency of one or more is continuously spread, for example, and to determine the input parameter value to be inappropriate in other cases. Moreover, the determination unit 130 may be configured to determine a newly input parameter value to be appropriate if it enters a volume zone or a class adjacent to a continuous spread of a class indicative of a frequency of one or more.

Figure 4:
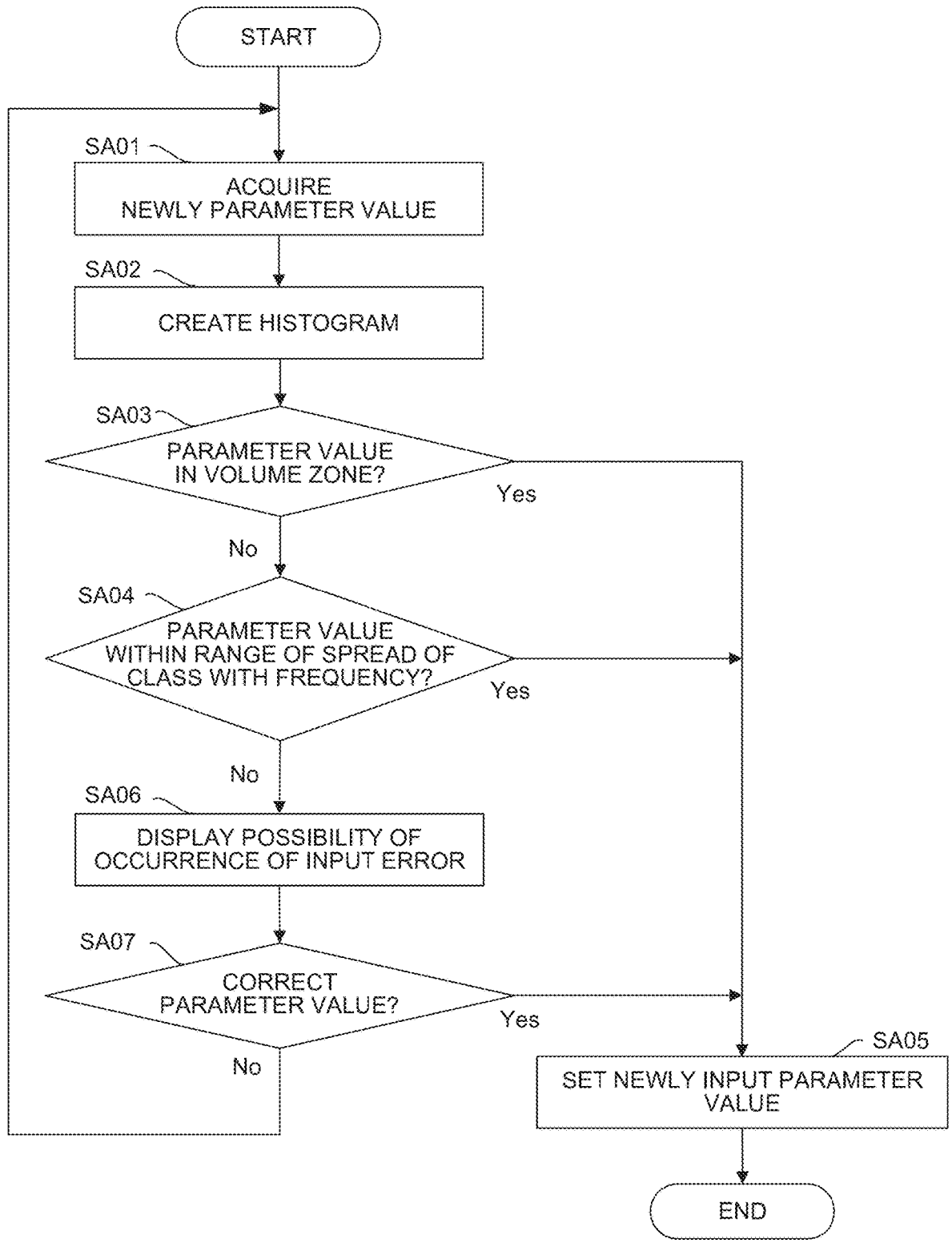
FIG. 4 is a flowchart schematically showing propriety determination processing for a newly input parameter value in the input error detection device according to the first embodiment.

FIG. 4 is a flowchart schematically showing propriety determination processing for a newly input parameter value by the determination unit 130. When the new parameter value is input from the parameter input unit 110 (Step SA01), the histogram creation unit 120 creates the histogram based on the input history for each of parameter items accumulated in the input history storage unit 220 (Step SA2). Then, the determination unit 130 compares the parameter value acquired in Step SA01 and the histogram created in Step SA02 and determines whether or not the parameter value exists in the volume zone of the histogram (Step SA03). If it is determined in Step SA03 that no parameter value exists in the volume zone of the histogram, the determination unit 130 further determines whether or not the parameter value is within the range of the spread of a class with frequency (class indicative of a frequency of one or more) of the histogram (Step SA04).

If it is determined in Step SA04 that the parameter value is not within the range of the spread of the class with frequency of the histogram, the determination unit 130 determines that the newly input parameter value is inappropriate and outputs a message to that effect to the parameter input unit 110. On receiving this message, the parameter input unit 110 displays the possibility of an error occurring in the input of the parameter value on the display/MDI unit 70, thereby prompting the worker for confirmation (Step SA06). If the worker determines that the parameter value is subject to an input error, the processing returns to Step SA01, whereupon the parameter value is input again.

In contrast, if it is determined in Step SA03 that the parameter value exists in the volume zone of the histogram, if it is determined in Step SA04 that the parameter value is within the range of the spread of the class with frequency of the histogram, or if it is determined by the worker in Step SA07 that the parameter value is correct, the parameter input unit 110 sets the input parameter value in the parameter storage unit 210.

In addition to this, the determination unit 130 may also be configured so that if a newly input parameter value is determined to be inappropriate, it estimates the cause of the wrong input of the parameter value concerned by the worker and outputs the result of the estimation. In the example shown in FIG. 3, for example, if an extremely small numerical value is given for the case where the newly input parameter value is deviated from the volume zone or the continuous spread of the class indicative of the frequency of one or more, failure to enter a decimal point may be estimated to be a possible cause of the wrong input. If an extremely large value is given, the number of zeros or the position of a decimal point may be estimated to be wrong.

According to the above configuration, the input error detection device of the present embodiment can determine the propriety of a parameter value input by the worker, based on a histogram created from a history input in the past. By using the histogram of the input history for the input value propriety determination, in particular, the input error detection device 1 of the present embodiment can accurately determine the propriety of the input value even in the case where there are a plurality of discrete groups of values to be determined to be appropriate for the same set item.

Figure 5:
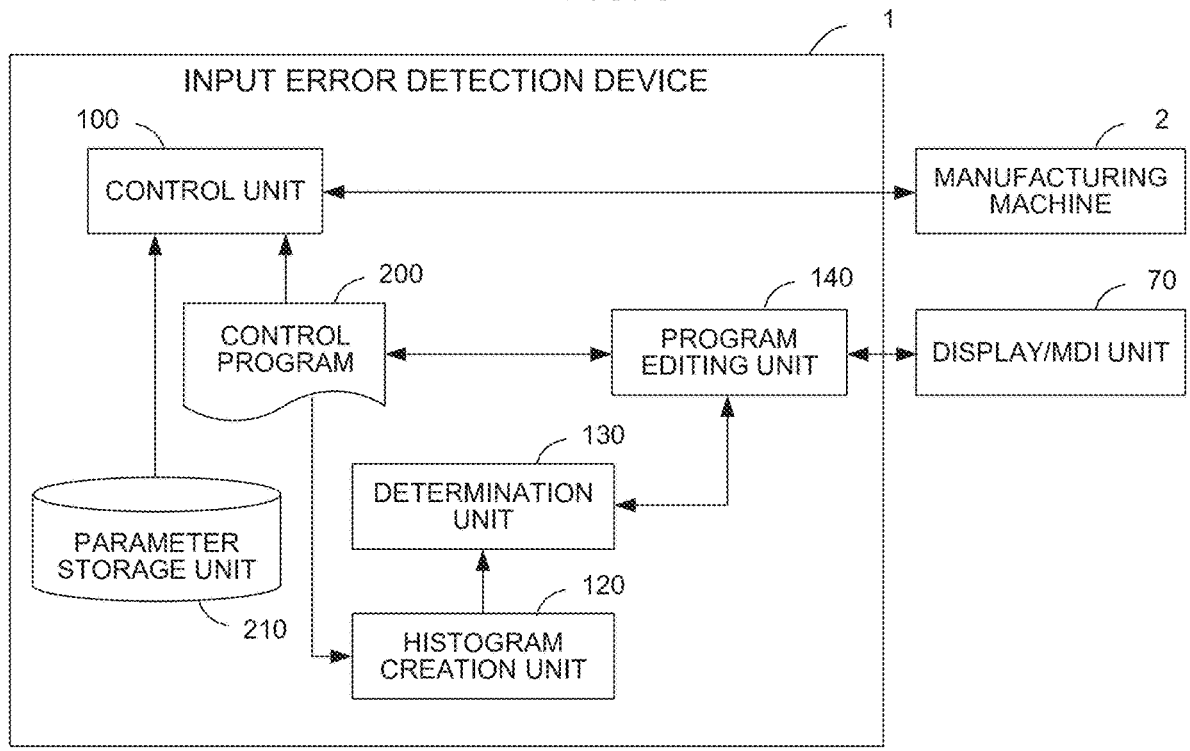
FIG. 5 is a schematic functional block diagram of an input error detection device according to a second embodiment.

FIG. 5 is a schematic functional block diagram of an input error detection device 1 according to a second embodiment. Each of functional blocks shown in FIG. 5 is implemented as the CPU 11 of the input error detection device 1 shown in FIG. 1 executes the individual system programs and controls operations of the various parts of the input error detection device 1.

The input error detection device 1 of the present embodiment differs from the first embodiment in that a histogram is created based on numerical values such as coordinate values included in each block of the control program 200 and the propriety of each numerical value in the control program 200 is determined based on the created histogram. The input error detection device 1 of the present embodiment comprises a program editing unit 140 configured to edit the control program 200.

The program editing unit 140 of the present embodiment is a functional means for displaying the control program 200 on the display/MDI unit 70, accepting the worker's editing operation on the displayed control program 200, and causing the result of the editing to be reflected in the control program 200. The program editing unit 140 has a general function related to the editing of the control program. Moreover, if there is a numerical value determined to be inappropriate by the control program 200, the program editing unit 140 performs display such that the numerical value determined to be inappropriate in the control program 200 displayed on the display/MDI unit 70 can be ascertained. This display may also be performed with the attributes of characters changed by, for example, changing the color of the numerical value determined to be inappropriate or inverting the color of the display compared with the background color. Furthermore, the program editing unit 140 may also be configured to display together the reason of the determination of the inappropriateness of the numerical value by the determination unit 130.

Figure 6:
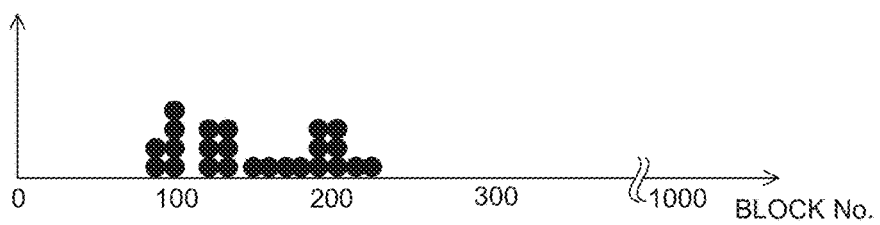
FIG. 6 is a diagram showing an example of a histogram based on a control program.
Figure 6:
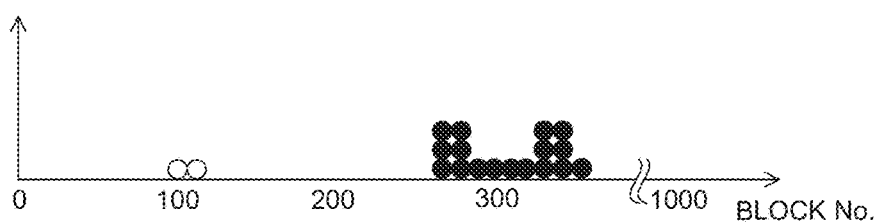

The histogram creation unit 120 of the present embodiment creates a plurality of histograms for each type of numerical values such as coordinate values (e.g., X- and Y-coordinate values) included in the control program 200. As shown in FIG. 6, for example, the histogram creation unit 120 divides a block in the control program 200 into classes for each predetermined range and creates, for each of the classes, a histogram based on the number of occurrences (occurrence frequency) of decimal-pointed numerical values as the frequency and a histogram based on the number of occurrences (occurrence frequency) of non-decimal-pointed numerical values as the frequency.

The determination unit 130 of the present embodiment determines an error in the input of a numerical value in the control program 200, based on the histogram created by the histogram creation unit 120. For example, when the histograms of the decimal-pointed and non-decimal-pointed numerical values are created based on the blocks as the classes, as shown in FIG. 6, the histogram creation unit 120 compares these two histograms in the same predetermined class range. If the ratio between the respective occurrence frequencies of the decimal-pointed and non-decimal-pointed numerical values exceeds a preset predetermined ratio, the numerical values with the lower occurrence frequency are determined to be subject to an input error. In the example shown in FIG. 6, for example, while the occurrence frequency of the decimal-pointed numerical values is higher near a block No. 100, a few non-decimal-pointed numerical values exist at the same time. In such a case, it is highly possible that the non-decimal-pointed numerical values are attributable to failure of decimal point input, so that the occurrence of an input error is determined, and the result of the determination (input error or failure of decimal point input) is output to the program editing unit 140.

As a modification of the present embodiment, the histogram creation unit 120 of the present embodiment may also be configured, in performing determination based on the occurrence frequencies of decimal-pointed and non-decimal-pointed numerical values, to divide the numerical values into classes for each predetermined range, for each type of numerical values, and to create, for each of the classes, a histogram based on the number of occurrences (occurrence frequency) of the decimal-pointed numerical values as the frequency and a histogram based on the number of occurrences (occurrence frequency) of the non-decimal-pointed numerical values as the frequency. Also in this case, the determination unit 130 compares the two histograms in the same predetermined class range and can determine the numerical values with the lower occurrence frequency to be subject to an input error if the ratio between the respective occurrence frequencies of the decimal-pointed and non-decimal-pointed numerical values exceeds a preset predetermined ratio.

Figure 7:
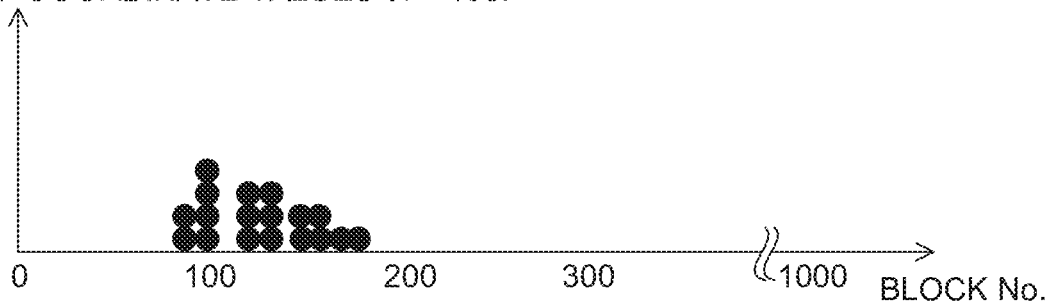
FIG. 7 is a diagram showing another example of the histogram based on the control program.
Figure 7:
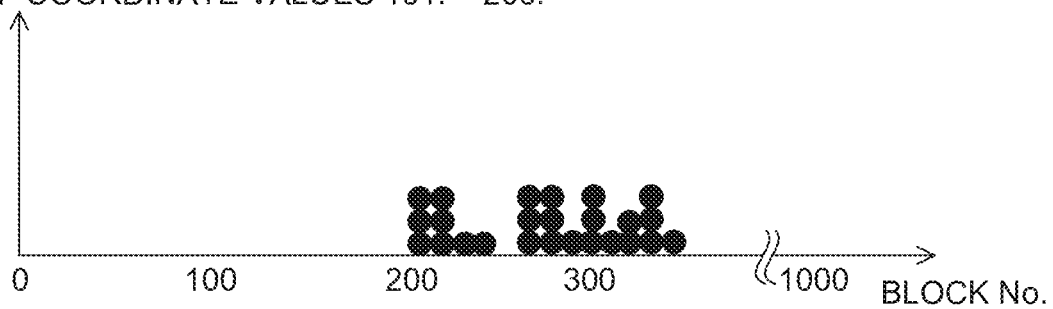
Figure 7:
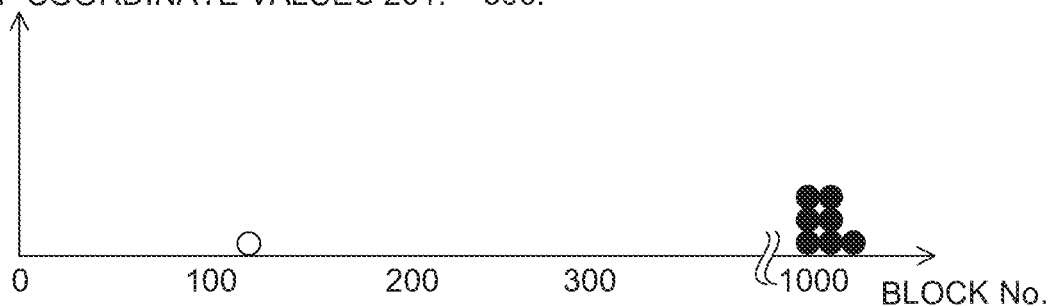
Figures 8, 9:
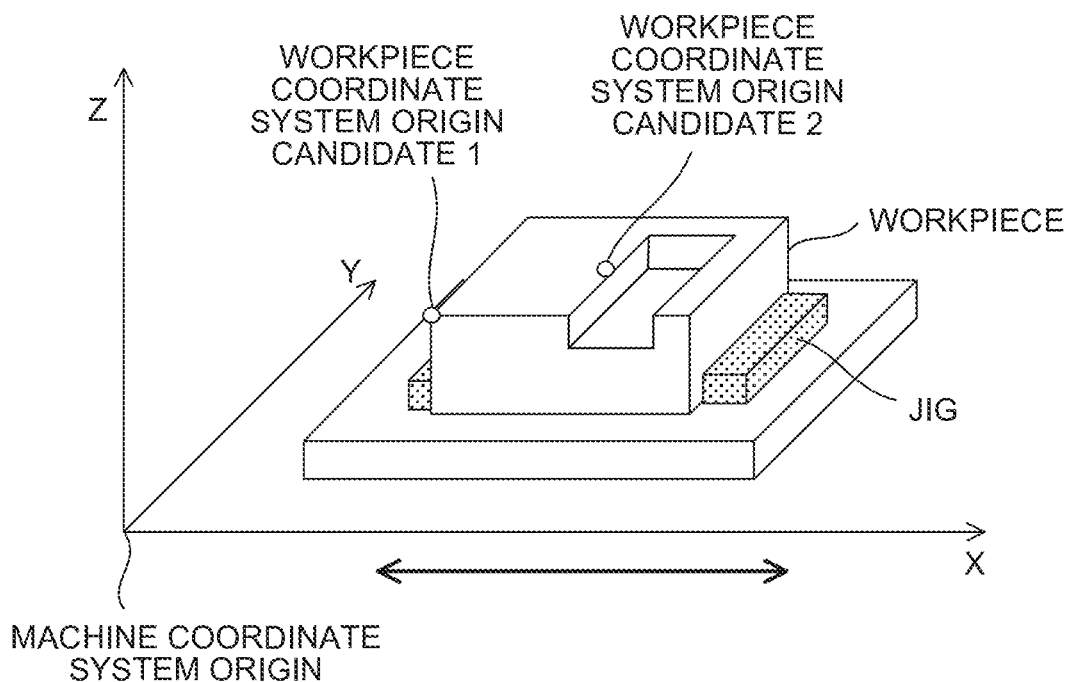
FIG. 8 is a diagram showing an example in which a workpiece coordinate system origin is set when a workpiece set in a manufacturing machine is machined.
FIG. 9 is a diagram showing an example of the control program.

As another modification of the present embodiment, as shown in FIG. 7, the histogram creation unit 120 of the present embodiment may also be configured to divide the block in the histogram creation unit 120 into classes for each predetermined range, for each type of numerical values such as coordinate values included in the control program 200, and to create, for each of the classes, a histogram based on the number of occurrences (occurrence frequency) for each division of a numerical range of the coordinate values concerned as the frequency. In such a case, the determination unit 130 compares a plurality of histograms in the same predetermined class range and can determine numerical values with an occurrence frequency extremely lower than that of a histogram of a division of another numerical range to be subject to an input error. In a control program for controlling a machine tool for machining a workpiece, in particular, many of commands for machining near positions on the workpiece are placed on near blocks, so that blocks including commands for movement to positions far from the position currently being machined may possibly be subject to input errors (or be special blocks for change of machining or the like). The worker can be cautioned by being informed of such numerical values.

While an embodiment of the present invention has been described above, the invention is not limited to the above-described embodiment and may be suitably modified and embodied in various forms.

For example, in the embodiment described above, the input error detection device 1 is illustrated as being implemented as the control device for controlling the manufacturing machine 2. Alternatively, however, the input error detection device 1 can be mounted on the personal computer located together with the control device or the computer, such as the cell computer or the host computer, as described before. In this case, a structure such as the control unit 100 peculiar to the control device is not essential to the input error detection device 1, and the input error detection device 1 can fulfill its role only if it comprises at least the histogram creation unit 120 and the determination unit 130. Data required by the histogram creation unit 120 and the determination unit 130 may be acquired from the control device through a network or the like as required, or the output of the determination unit 130 can be sent to the control device side to be used there. Moreover, principal functional means of the input error detection device 1 of the present invention can be mounted on, for example, a graphics processing unit (GPU) as well as on a computer provided with a so-called CPU. For example, the principal functional means can also be mounted on the display/MDI unit 70 of FIG. 1. If this is done, necessary data should only be acquired from the control device or the computer.

Furthermore, the first and second embodiments described above can be made to coexist on the same input error detection device 1. If this is done, the input error detection device 1 can check respective input errors of parameter values input by the worker and numerical values in the control program at any desired timings.

The invention claimed is:

1. An input error detection device configured to detect an error in inputting a value used to control a manufacturing machine having a servo motor configured to drive two or more axes of the manufacturing machine, the input error detection device comprising:
 a processor configured
  to create a histogram based on a set of values which are stored in a memory associated with the manufacturing machine and are used to control the servo motor to drive the two or more axes of the manufacturing machine, and
  based on the histogram, to determine the error in inputting the value used to control the manufacturing machine,
 wherein
  the set of values include numerical values for controlling the servo motor to drive the two or more axes of the manufacturing machine,
  the processor is further configured to divide the numerical values into classes for each of a predetermined range of maximum and minimum command amounts that the manufacturing machine handles and create a plurality of histograms for each of the classes,
  the processor is further configured to determine the error in inputting a numerical value by comparing the plurality of histograms,
  the error includes at least one of erroneous decimal point, erroneous number of digits, wrong entry of names of one of the two or more axes of the manufacturing machine, or input data that is deviated from the range of the maximum and minimum command amounts that the manufacturing machine handles,
  the processor is further configured to, in response to determining the error, cause a display to display a possibility of the error occurring in the inputting of the numerical value, to facilitate confirmation of the possibility of the error, and
  in response to determining the error, the processor is further configured to receive a corrected numerical value input by an operator to correct the detected and displayed error, and use the corrected numerical value input by the operator to control the servo motor to drive the axes of the manufacturing machine.

2. The input error detection device according to claim 1, wherein
 the sets of values used to control the manufacturing machine include parameter values, and
 the processor is further configured to
  create the histogram based on histories of parameter values input in the past and used to control the manufacturing machine, and
  determine an error in inputting the parameter value by comparing the histogram and a newly input parameter value used to control the manufacturing machine.

3. The input error detection device according to claim 1, wherein
 the numerical values are included in a control program used to control the manufacturing machine, and
 the processor is further configured to
  create the plurality of histograms based on the numerical values included in the control program used to control the manufacturing machine, and determine errors in inputting the numerical values included in the control program by comparing the plurality of histograms.

4. The input error detection device according to claim 3, wherein the processor is further configured to
 divide a block in the control program into classes for each predetermined range and create, for each of the classes, the plurality of histograms based on an occurrence frequency as a frequency for each division of a predetermined range of the numerical values, and
 determine the errors in inputting the numerical values included in the control program by comparing the plurality of histograms.

5. The input error detection device according to claim 1, wherein the processor is further configured, in response to a determination that a newly input parameter value is determined to be inappropriate, to estimate a cause of wrong input of the parameter value and output the result of the estimation.

6. The input error detection device according to claim 1, wherein the processor is further configured to determine a newly input parameter value to be appropriate when the newly input parameter value enters a volume zone or a class adjacent to a continuous spread of a class indicative of a frequency of one or more.

7. An input error detection device configured to detect an error in inputting a value used to control a manufacturing machine having a servo motor configured to drive two or more axes of the manufacturing machine, the input error detection device comprising:
 a parameter input unit;
 a control unit;
 a histogram creation unit configured to create a histogram based on a set of values which are stored in a memory associated with the manufacturing machine and are used to control the servo motor to drive the two or more axes of the manufacturing machine; and
 a determination unit configured, based on the histogram, to determine the error in inputting the value used to control the manufacturing machine,
 wherein
  the set of values include numerical values included in a control program for controlling the servo motor to drive the two or more axes of the manufacturing machine,
 wherein
  the histogram creation unit
   divides the numerical values included in a block in the control program into classes for each of a predetermined range of maximum and minimum command amounts that the manufacturing machine handles, and creates, for each of the classes, a histogram based on an occurrence frequency of decimal-pointed numerical values as a frequency and a histogram based on an occurrence frequency of non-decimal-pointed numerical values as a frequency, and the determination unit determines the error in inputting a numerical value included in the control program by comparing the histogram of the decimal-pointed numerical values and the histogram of the non-decimal-pointed numerical values, and wherein the error includes at least one of erroneous decimal point, erroneous number of digits, wrong entry of names of one of the two or more axes of the manufacturing machine, or input data that is deviated from the range of the maximum and minimum command amounts that the manufacturing machine handles, in response to determining the error, the parameter input unit displays a possibility of the error occurring in the inputting of the numerical value, to facilitate confirmation of the possibility of the error, and in response to determining the error, the parameter input unit receives a corrected numerical value input by an operator to correct the detected and displayed error, and the control unit uses the corrected numerical value input by the operator to control the servo motor to drive the axes of the manufacturing machine.

8. An input error detection device configured to detect an error in inputting a value used to control a manufacturing machine having a servo motor configured to drive two or more axes of the manufacturing machine, the input error detection device comprising:

a parameter input unit;

a control unit;

a histogram creation unit configured to create a histogram based on a set of values which are stored in a memory associated with the manufacturing machine and are used to control the servo motor to drive the two or more axes of the manufacturing machine; and a determination unit configured, based on the histogram, to determine the error in inputting the value used to control the manufacturing machine, wherein the set of values include numerical values included in a control program for controlling the servo motor to drive the two or more axes of the manufacturing machine, wherein the histogram creation unit divides the numerical values included in the control program into classes for each of a predetermined range of maximum and minimum command amounts that the manufacturing machine handles, and creates, for each of the classes, a histogram based on an occurrence frequency of decimal-pointed numerical values as a frequency and a histogram based on an occurrence frequency of non-decimal-pointed numerical values as a frequency, and the determination unit determines the error in inputting a numerical value included in the control program by comparing the histogram of the decimal-pointed numerical values and the histogram of the non-decimal-pointed numerical values, and wherein the error includes at least one of erroneous decimal point, erroneous number of digits, wrong entry of names of one of the two or more axes of the manufacturing machine, or input data that is deviated from the range of the maximum and minimum command amounts that the manufacturing machine handles, in response to determining the error, the parameter input unit displays a possibility of the error occurring in the inputting of the numerical value, to facilitate confirmation of the possibility of the error, and in response to determining the error, the parameter input unit receives a corrected numerical value input by an operator to correct the detected and displayed error, and the control unit uses the corrected numerical value input by the operator to control the servo motor to drive the axes of the manufacturing machine.

* * * * *